Aug. 29, 1961  R. R. PITTS  2,998,213
EJECTION SEAT
Filed Dec. 20, 1957  2 Sheets-Sheet 1
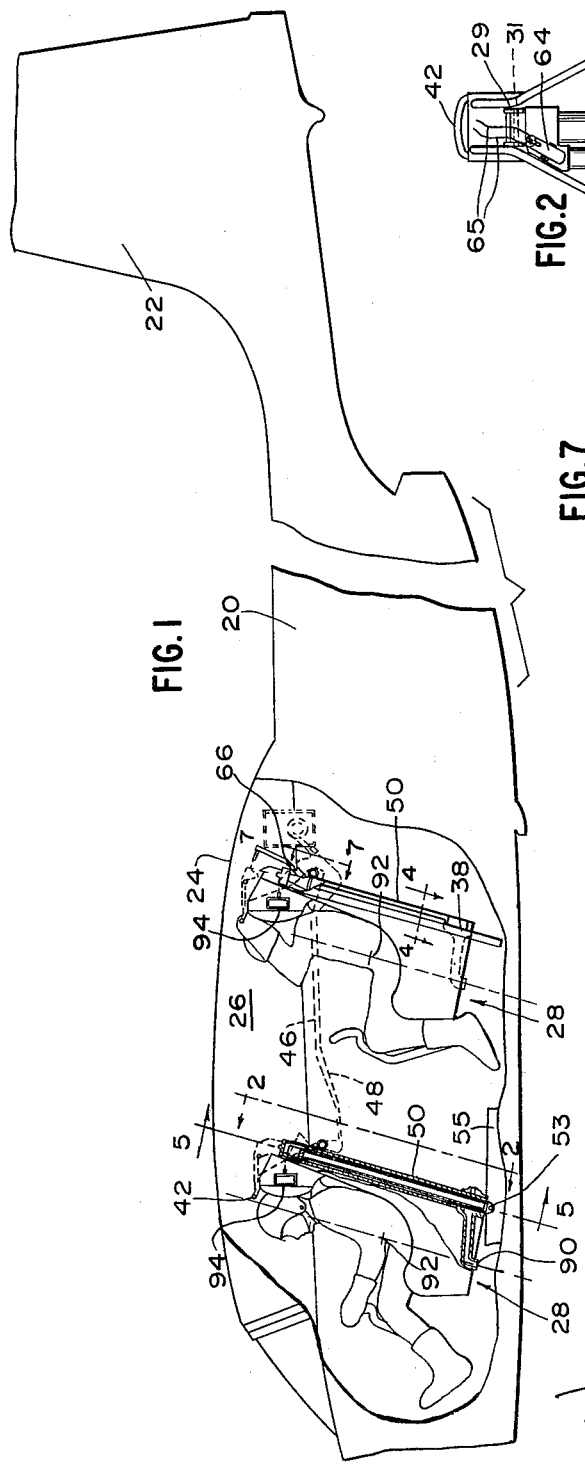
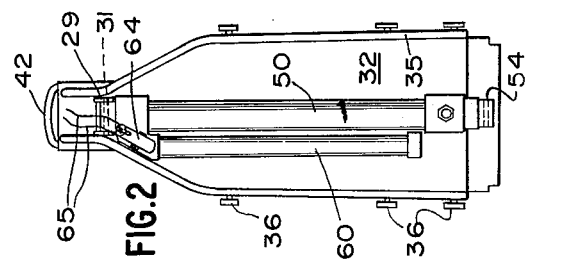
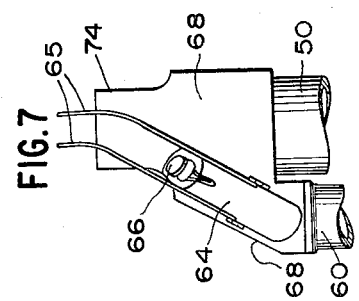
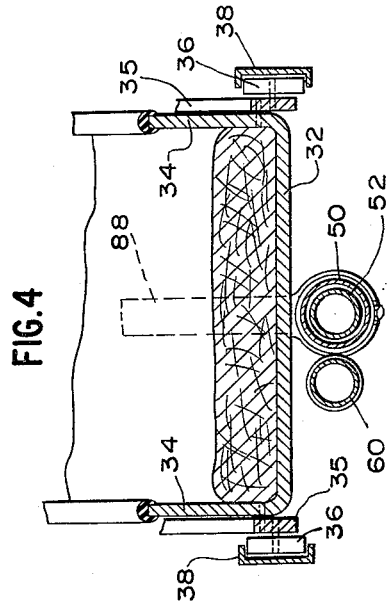
INVENTOR.
RICHARD R. PITTS
BY
Raymond W. Colton
ATTORNEY Aug. 29, 1961  R. R. PITTS  2,998,213
EJECTION SEAT
Filed Dec. 20, 1957  2 Sheets-Sheet 2
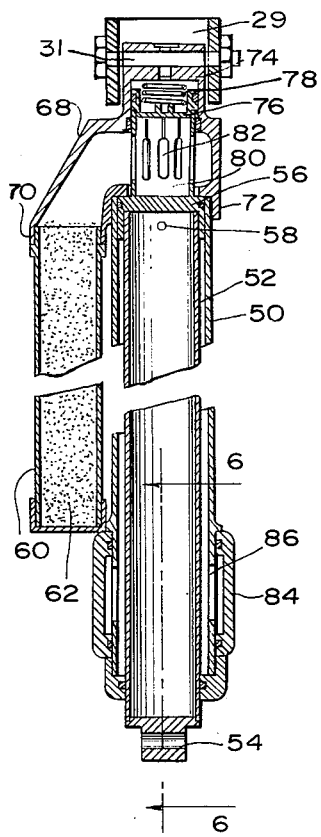
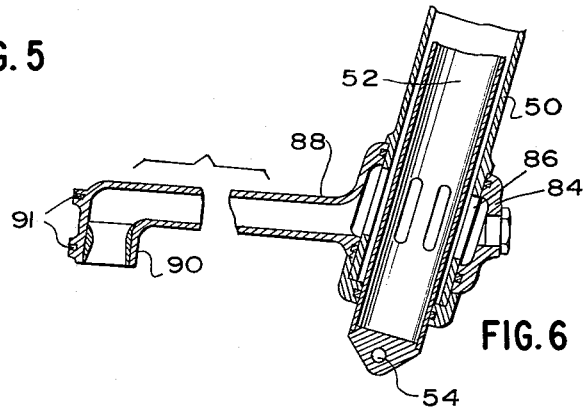
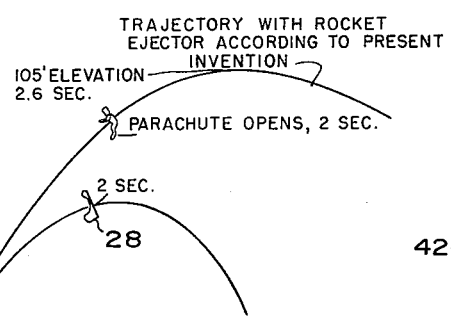
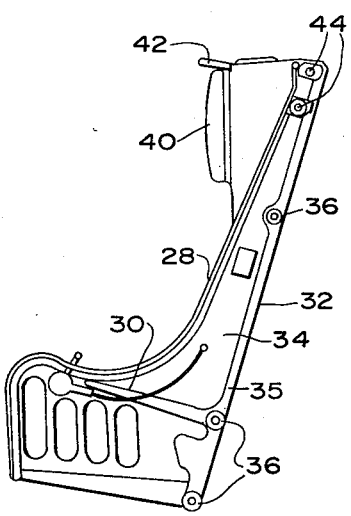
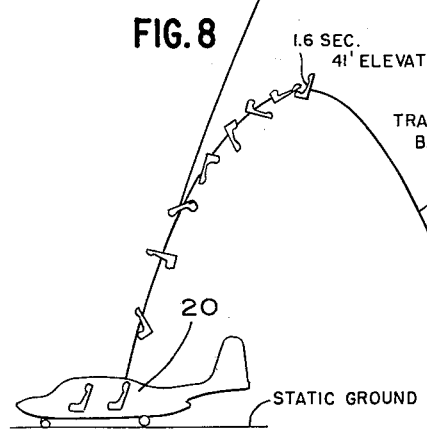
INVENTOR.
RICHARD R. PITTS
BY
Raymond W. Cotton
ATTORNEY – 2,998,213
EJECTION SEAT
Richard R. Pitts, Arlington, Tex., assignor, by mesne assignments, to Temco Electronics & Missiles Company, Dallas, Tex., a corporation of Delaware
Filed Dec. 20, 1957, Ser. No. 704,052
9 Claims. (Cl. 244—122)

This invention relates to apparatus for ejecting a pilot or other personnel from an aircraft, particularly adapted for low level conditions where the craft has assumed close proximity to the ground under circumstances which dictate forcible ejection as the only acceptable procedure.

Various arrangements proposed in the past for projecting occupants from aircraft at high altitude, including explosive and spring energized catapults, have failed to satisfy the requirements of safety and dependability necessary for low level ejection. Low level seat ejection involves all of the problems encountered in high altitude ejection, including acceleration limitations, adequate separation from the aircraft, avoidance of aircraft protuberances, loss of oxygen and pressure supply, parachute opening shock, and air blast effects on man and equipment. Low level ejection introduces an additional problem of achieving sufficient separation of the pilot from a relatively low speed aircraft to assure opening of his parachute so as to clear the craft itself. One of the problems to be solved therefore involves the question of how to fire a man high enough above ground level for his parachute to open, without causing serious injury to his spine. Redesign of conventional equipment by increasing its stroke, power, and/or size has failed to solve this problem.

The present invention includes among its objects: the provision of an ejection device operable at or near ground level for ejecting an occupant from an aircraft approaching stall conditions to a level adequate to assure parachute opening without danger from excessive acceleration or impact with portions of the craft; the provision of an ejection device utilizing rocket or comparable reaction propulsion characterized by relatively slow-burning action, and capable of producing a relatively high velocity at relatively low acceleration rates as compared with results achieved with ballistic cartridges; the provision of a rocket propelled seat, for low level ejection of an aircraft occupant, designed to minimize the possibility of injury to another occupant from exhaust gases discharged from the rocket; the provision of a rocket propelled seat for low level ejection of an aircraft occupant designed to substantially avoid the tumbling motion which is so common with conventional ejection devices; the provision of an ejection device having few parts of relatively simple construction whereby the device may be easily fabricated and assembled in an inexpensive manner.

A more complete understanding of the invention will follow from a description of the accompanying drawings wherein:

FIG. 1 is a fragmentary side elevation, partially broken away, of an aircraft incorporating the present invention;

FIG. 2 is an enlarged rear elevation of one of the seats taken along line 2—2 of FIGURE 1;

FIG. 3 is a side elevation of the seat shown in FIG. 2, omitting the propelling mechanism;

FIG. 4 is an enlarged section taken along line 4—4 of FIG. 1;

FIG. 5 is an enlarged fragmentary section taken along line 5—5 of FIG. 1;

FIG. 6 is a fragmentary section taken along line 6—6 of FIG. 5 showing a propulsion exhaust nozzle;

FIG. 7 is a fragmentary elevation showing an igniter arrangement; and

FIG. 8 is a diagrammatic presentation of an ejection trajectory achieved according to this invention.

The aircraft depicted in FIG. 1 is provided with an upstanding tail 22 and a conventional jettisonable canopy 24 for enclosing its cockpit 26. Within the cockpit fore and aft ejection seats 28 are constructed and arranged to illustrate a preferred embodiment of the invention.

Each of the seats 28, as shown in FIG. 3, comprises an occupant supporting bottom 30, a back 32 inclined upwardly and slightly rearwardly, and a pair of sides 34. Each of the sides 34 is provided with a frame member 35 carrying a plurality of aligned stub shafts rotatably supporting guide rollers or follower members 36. These rollers 36 are received by oppositely disposed channels defined by a pair of rearwardly inclined guides 38, best shown in FIGS. 1 and 4, which are fastened to the frame of the aircraft in any desired manner.

Each of the seats 28 is provided with a head rest 40, behind which there is disposed a conventional face curtain which may be extracted for use by exerting pull on its handle 42. The upper portions of each of the sides 34 carry a pair of small roller sheaves 44, misaligned with respect to the rollers 36, serving as guides for a pair of control cables 46 and 48, depicted by broken lines in FIG. 1.

Fastened centrally to the back 32 of each seat 28 by means of a bracket 29 and pin 31 for example, is an elongated cylinder 50 open at its lower end and inclined rearwardly at an angle corresponding with that of the guides 38. A piston 52 received within the cylinder 50 has a lower end containing an opening 54 for reception of a pin 53 by which it is coupled to the air frame 55. The piston has a head 56 at its upper end which is ordinarily secured in its uppermost position within the cylinder 50 by means of a shear pin 58. Since the cylinder 50 is fastened to the seat frame, the shear pin 58, due to friction between the cylinder 50 and the piston 52, also serves to restrain the seat against movement. A gaseous jet-generator 60 of the relatively slow-burning reaction type, preferably a rocket motor of preselected design, is also disposed along the back of the seat 28. As best shown in FIG. 2, the housing of the rocket motor is disposed adjacent to and substantially coextensive with the cylinder 50. The rocket housing as depicted in FIG. 5 is substantially filled with a relatively slow-burning propellant powder 62 which is adapted to be ignited electrically by means of a conventional igniter 64, such as that shown in FIG. 7, provided with a safety pin 66. The igniter 64 is fixed to the manifold 68 and disposed at an angle of less than 180° with respect to the rocket motor and cylinder, as clearly shown in the drawings. A gas supply manifold 68 serves to establish communication between the rocket 60 and the upper end of the cylinder 50, having sockets 70 and 72 receiving the open upper ends of the rocket and cylinder respectively, and welded thereto. The reactive thrust of exhaust gas from the rocket tending to produce relative movement between the cylinder 50 and the piston 52 is borne by a cylindrical cap portion 74 of reduced diameter carried by the manifold 68 in axial alignment with the head 56 of the piston 52. The cap portion 74 receives a small piston 76 which is biased by means of a coil spring 78 against the upper end of a cylindrical extension 80 projecting from the head 56 and containing a plurality of radial slots 82 through which the rocket-generated gas will enter the cylinder 50.

At the lower end of the cylinder 50 there is a permanently attached ring-like manifold 84 in communication with the cylinder 50 through radial ports 86 formed through the cylinder. A tubular arm 88 integral with the manifold 84, extends forwardly under the seat bottom 30 and terminates in a downwardly disposed discharge nozzle 90 offset with respect to the cylinder 50. The forward wall of the nozzle 90, shown in FIG. 5, contains a pair of threaded openings 91 for the reception of screws, not shown, to secure the forward end of the tubular arm to an appropriate portion of the seat frame. The nozzle 90 will have its axis disposed at such an angle to the axis of the cylinder 50 as to compensate for the rearward thrust component of the exhaust gas. Moreover, the axis of the nozzle 90 includes the center of gravity 92 of the combined seat and occupant. By virtue of these relationships, the tumbling effects will be reduced to a minimum as will appear from a study of the preferred type of trajectory indicated in FIG. 8.

The control cables 46 and 48, shown in FIG. 1 by broken lines, are suitably attached to the operating handle 42 and to an auxiliary handle 94 respectively, and actuation of either of these handles will ultimately effect retraction of their igniter safety pins 66 for actuating the igniters. A suitable linkage from the canopy, not constituting a part of this invention, will pull the safety pin 66 and arm the igniter 64 of one of the seats. Further extension of the face curtain will electrically fire the rocket motor for that seat by means of a pair of conductors 65, partially shown in FIG. 7. Linkage from the rising seat will pull the safety pin and arm the second seat. Full extension of the seat face curtain of the second seat will then fire the rocket and eject the second seat. Either the front or rear seat may be programmed to fire first. If the front seat is ejected before the rear one, the rocket gas discharged therefrom is exhausted through the nozzle 90 so as to be directed away from the face of the occupant of the rear seat and at a sufficient distance to avoid injury. In the event the rear seat is fired first, the occupant of the front seat is protected by his seat and by virtue of the fact that the direction of the exhaust gases from the rising rear seat will be substantially parallel to and displaced from the front seat. In case of a failure of the contemplated sequence, a manual over-ride is effected by pulling either of the handles 94, shown in the form of D-rings. This action will directly pull the safety pin and arm its respective seat, permitting the occupant to eject himself without regard to any particular sequence or failure thereof.

Firing either of the seat rocket motors 60, produces a seat ejecting reaction which is initiated at a relatively slow rate as compared to results with a ballistic discharge. This rate is predeterminable by the choice of the rocket powder, by the size of the motor, and by the nozzle design, among other factors. The rocket generated gas passes through the manifold 68 and the slots 82 to the space in the cylindrical extension 80 between the cap 74 and the head 56 of the piston 52. The pressure elevates the small piston 76 against the force of the spring 78 until the gas pressure has built up sufficiently, whereupon the cylinder 50 and its attached seat 28 will move upwardly relative to the piston 52 and the airframe under the guidance of the channels 38 and the rollers 36. As soon as the ports 86 clear the piston head 56, the inturned flange at the lower end of the cylinder 50 engages the head 56, causing the pin 58 to be sheared, whereupon the head 56 becomes a closure for the lower end of the cylinder 50 and the generated gases will traverse the tubular passage 88 and discharge to atmosphere through the exhaust nozzle 90.

Inasmuch as the angle of the discharge nozzle is displaced from parallelism relative to the guides 38 by only the small amount necessary to avoid tumbling, there is no danger that the other occupant or occupants of the aircraft will be injured from the blast. Since the rocket is designed to burn out at the time the seat has travelled a vertical distance of about 7.5 feet, substantially all of the gas generated will be discharged from the nozzle 90.

A comparison of the trajectory of a seat fired by a rocket device according to the present invention with that produced by a conventional ballistic charge appears in FIG. 8. The seat fired ballistically reaches an approximate maximum height of only 41 feet, which is inadequate under conditions approaching ground level ejection to permit the opening of a parachute. The maximum horizontal range of a ballistically fired seat is 48.5 feet, the total time of flight is approximately 3.2 seconds, the maximum velocity is 51.1 feet per second, and the maximum acceleration is 24.4 G's which approaches the danger point for spinal injuries. In addition, the seat and occupant are invariably subjected to severe tumbling action as portrayed by the indicated seat positions during ejection.

In contrast, the trajectory with the rocket ejector according to the present invention reaches a maximum height of approximately 105 feet, under which conditions the pilot's parachute can be timed to open in 2 seconds at which time the pilot has been elevated 100 feet. The rocket firing time is 0.26 second, the maximum velocity obtained is 85 feet per second, the maximum horizontal range is 131 feet, and the maximum acceleration developed is only 15 G's which is well within the limit of danger of spinal injury. In addition, the tumbling motion is avoided. Incidentally, as indicated by the preferred type of trajectory, the pilot can be released from the seat at the end of 1 second.

Although only one embodiment of the invention has been shown and described, many modifications within the scope of the appended claims are contemplated.

I claim:

1. An escape device for aircraft comprising, an occupant supporting seat having a back member and a bottom member, a cylinder having an open end fastened to said seat and disposed along said back member, a piston in said cylinder having a portion extending from the open end thereof for fastening to said aircraft, a separable head carried by said piston for closing the open end of said cylinder, an elongated rocket motor disposed along said back member and having a discharge manifold communicating with said cylinder, and an exhaust manifold secured to said cylinder having a gas passage leading to a discharge nozzle offset with respect to said cylinder for exhausting rocket motor gas from below said seat bottom member.

2. A self-propelling, ejectable seat for aircraft comprising an occupant supporting bottom member and an upwardly extending back member, an elongated cylinder fastened to said seat having its axis parallel to the back member thereof, a piston in said cylinder fixedly secured to the aircraft, a separable head carried by said piston for closing an end of said cylinder, an elongated gaseous jet-generator secured to said cylinder by means including a gas entry port for propelling said cylinder and attached seat with respect to said fixed piston, and an exhaust manifold on said cylinder having a discharge nozzle under said seat bottom member and offset from the cylinder axis.

3. A self-propelling, ejectable seat for aircraft according to claim 2 wherein the axis of said offset discharge nozzle passes through the combination occupant-seat center of gravity.

4. A self-propelling, ejectable seat for aircraft according to claim 2 wherein the axis of said offset discharge nozzle is inclined slightly with respect to the axis of said cylinder whereby to counteract the non-axial thrust of exhaust gas flowing from said cylinder through said exhaust manifold to said discharge nozzle and substantially eliminate tumbling of the ejected seat.

5. A self-propelling, ejectable seat for aircraft according to claim 2 wherein said gaseous jet-generator comprises a rocket motor having an igniter, said igniter being secured to the rocket motor adjacent said gas entry port and angularly disposed with respect to the housing of said motor.

6. In an aircraft having a plurality of seats, at least one seat having an occupant supporting bottom and upwardly extending back, said one seat having a follower member at each side, guide means fixed within the aircraft and leading upwardly toward an opening therein, said guide means engaging the follower members at the side of said seat, an elongated cylinder open at its bottom fastened to the back of said seat having its axis parallel to said guide means, a reaction type gas generating motor secured to said seat, a gas entry port at the upper end of said cylinder communicating with said motor, a piston in said cylinder fastened at its lower end to the aircraft, a separable head carried by said piston for closing the bottom of said cylinder, and a gas discharge manifold near the lower end of said cylinder leading to a discharge nozzle displaced from said cylinder and below the bottom of said one seat, said discharge nozzle having an axis substantially intersecting the center of gravity of said seat and its occupant.

7. In an aircraft, a self-propelling, ejectable seat having an occupant supporting bottom and an upwardly extending back, an open bottom cylinder fastened to said seat and disposed along its back, a piston having a head in said cylinder and a lower end fastened to the aircraft, a shear pin passing through said head and piston to releasably hold said head at the upper portion of the piston to serve as a closure for the open bottom of said cylinder, a rocket motor secured to said seat and coupled to the upper end of said cylinder for the introduction of rocket gas above said piston head to eject said seat and cylinder upwardly and with relatively slow and safe acceleration away from said piston and aircraft, the shear pin being fractured by the force generated by said rocket motor, and a gas discharge manifold at the lower end of said cylinder leading to a discharge nozzle displaced forwardly relative to said cylinder.

8. In combination with an aircraft having a plurality of seats, a self-propelling, ejectable seat for safe ground level ejection, said seat having an occupant supporting bottom and an upwardly extending back, an open bottom cylinder fastened to said seat and disposed along its back, a piston in said cylinder fastened at its lower end to the aircraft, a separable head carried by said piston for closing the bottom of said cylinder, a rocket motor coupled to the upper end of said cylinder for entry of rocket-generated gas above said piston, and a gas discharge manifold at the lower end of said cylinder leading to a discharge nozzle displaced from said cylinder in a direction away from aircraft occupants of seats other than said ejectable seat.

9. A low level ejection seat comprising back and bottom members, a gaseous-jet generating reaction motor secured to said back member, and a discharge nozzle communicating with said motor disposed forwardly of said back member and having an axis directed downwardly relative to said bottom member and substantially intersecting the center of gravity of said seat and its occupant.

References Cited in the file of this patent
UNITED STATES PATENTS

| | | |
|---|---|---|
| 2,552,181 | Kleinhans | May 8, 1951 |
| 2,709,556 | Jandris | May 31, 1955 |
| 2,900,150 | Hirt et al. | Aug. 18, 1959 |

FOREIGN PATENTS

| | | |
|---|---|---|
| 918,006 | Germany | Sept. 20, 1954 |

OTHER REFERENCES

Aviation Week, Nov. 12, 1956, volume 65, No. 20 (pages 71, 72, 74, 77).